(12) United States Patent
Dueker et al.

(10) Patent No.: US 7,088,222 B1
(45) Date of Patent: Aug. 8, 2006

(54) RUGGEDIZED ILLUMINATING, MARKING, OR SIGNALING DEVICE AND SYSTEM

(75) Inventors: Kenneth S. Dueker, Atherton, CA (US); Paul M. Hagelin, Saratoga, CA (US); Troy J. Edwards, Campbell, CA (US); Russell E. Tavernetti, San Carlos, CA (US)

(73) Assignee: PowerFlare Corporation, Menlo Park, CA (US)

( * ) Notice: Subject to any disclaimer, the term of this patent is extended or adjusted under 35 U.S.C. 154(b) by 141 days.

(21) Appl. No.: 10/712,431

(22) Filed: Nov. 12, 2003

Related U.S. Application Data

(60) Provisional application No. 60/426,248, filed on Nov. 13, 2002.

(51) Int. Cl.
*G08B 23/00* (2006.01)
(52) U.S. Cl. .................. 340/321; 340/473; 340/908.1; 362/153.1
(58) Field of Classification Search ............. 340/908.1, 340/321, 473, 932, 332, 331, 815.4, 815.45, 340/326; 362/153.1, 183, 364, 369, 800, 362/326, 157, 185, 194, 196, 200, 201, 204, 362/645, 362, 367, 363, 249
See application file for complete search history.

(56) References Cited

U.S. PATENT DOCUMENTS

| | | | | |
|---|---|---|---|---|
| 3,456,103 A | * | 7/1969 | Bond | 362/267 |
| 4,268,894 A | * | 5/1981 | Bartunek et al. | 362/158 |
| 4,403,274 A | * | 9/1983 | Moore | 362/186 |
| 4,590,471 A | * | 5/1986 | Pieroway et al. | 340/825.69 |
| 4,873,933 A | | 10/1989 | Bennett et al. | 441/36 |
| 5,103,383 A | | 4/1992 | Mayhew | 362/186 |
| 5,203,624 A | | 4/1993 | Schier et al. | 362/158 |
| 5,216,418 A | * | 6/1993 | Lenz et al. | 340/384.1 |
| 5,287,257 A | | 2/1994 | Schier et al. | 362/186 |
| 5,313,187 A | | 5/1994 | Choi et al. | 340/331 |
| 5,319,365 A | | 6/1994 | Hillinger | 340/908.1 |
| 5,359,448 A | * | 10/1994 | Laszlo et al. | 398/130 |
| 5,446,345 A | * | 8/1995 | Halabi et al. | 315/200 A |
| 5,585,783 A | | 12/1996 | Hall | 340/473 |
| 5,633,623 A | * | 5/1997 | Campman | 340/321 |
| 5,797,672 A | | 8/1998 | Dobert | 362/190 |
| 5,831,522 A | | 11/1998 | Weed et al. | 340/473 |
| 5,839,816 A | | 11/1998 | Varga et al. | 362/153.1 |

(Continued)

OTHER PUBLICATIONS

"Trek® Disco Inferno Tail Light," www.trekbikes.com, 1 pg, Aug. 25, 2003.

(Continued)

*Primary Examiner*—Brent A. Swarthout
(74) *Attorney, Agent, or Firm*—Sawyer Law Group LLP

(57) ABSTRACT

An illumination device, including: a shell with a plurality of sides, where the device can be positioned upon a surface or attached or suspended at any of the plurality of sides; and at least one light-emitting device within the shell, where when the device is positioned upon a surface or attached or suspended at any of the plurality of sides of the shell, light from the at least one light-emitting device emits through each of the plurality of sides of the shell. The device is thus easy to deploy and use. Its design is compatible with outsourced manufacturing, allowing for cost savings. The device can be reused many times. The device can also emit light for many hours longer and has ruggedness that far exceeds conventional devices. The device can also be used where conventional devices and other lighting devices cannot, including underwater.

49 Claims, 15 Drawing Sheets

U.S. PATENT DOCUMENTS

| | | | | |
|---|---|---|---|---|
| 5,984,570 | A | * | 11/1999 | Parashar ....................... 404/14 |
| D420,302 | S | | 2/2000 | Barnhart .................... D10/113 |
| 6,069,557 | A | * | 5/2000 | Anglin et al. ................ 340/321 |
| 6,134,820 | A | * | 10/2000 | Martinez ...................... 40/586 |
| 6,310,609 | B1 | * | 10/2001 | Morgenthaler .............. 345/170 |
| 6,329,933 | B1 | | 12/2001 | Mikesic ....................... 340/946 |
| 6,515,584 | B1 | | 2/2003 | DeYoung .................... 340/475 |
| 6,549,121 | B1 | * | 4/2003 | Povey et al. ................. 340/322 |
| 6,900,735 | B1 | * | 5/2005 | Guerrieri et al. ......... 340/815.4 |

OTHER PUBLICATIONS

Kong Young Lamps & Safety Co., Ltd., U.S. Dept. of Transportation, 6 pages.

"About the DURAFLARE," www.pittco,com, 2 pages.

"Personal Safety Lite," www.marpac.com, 4 pages.

"Portable Signal Lite," www.marpac.com, 2 pages.

"Three Lites/Three Stands Kit," www.marpac.com, 2 pages.

Led Smartbright, inovalight.com, 2 pages.

"The Signalfly Helmet Brake Light," www.webbikeworld.com, 6 pages.

"Led Safety Devices," www.dalmark.com, 1 pg.

"Active Road Marking Systems for Traffic Safety," www.dalmark.com, 2 pages.

Turboflare-Products and Technical Specifications, 3 pages.

"More than Just a Road Marker Lanelight," www.swarco.com, 2 pages.

"Low Profile Signal Head," www.crosswalks.com, 1 pg.

* cited by examiner

Isometric View

Top View

Bottom View

Front View

Left View

Right View

Back View

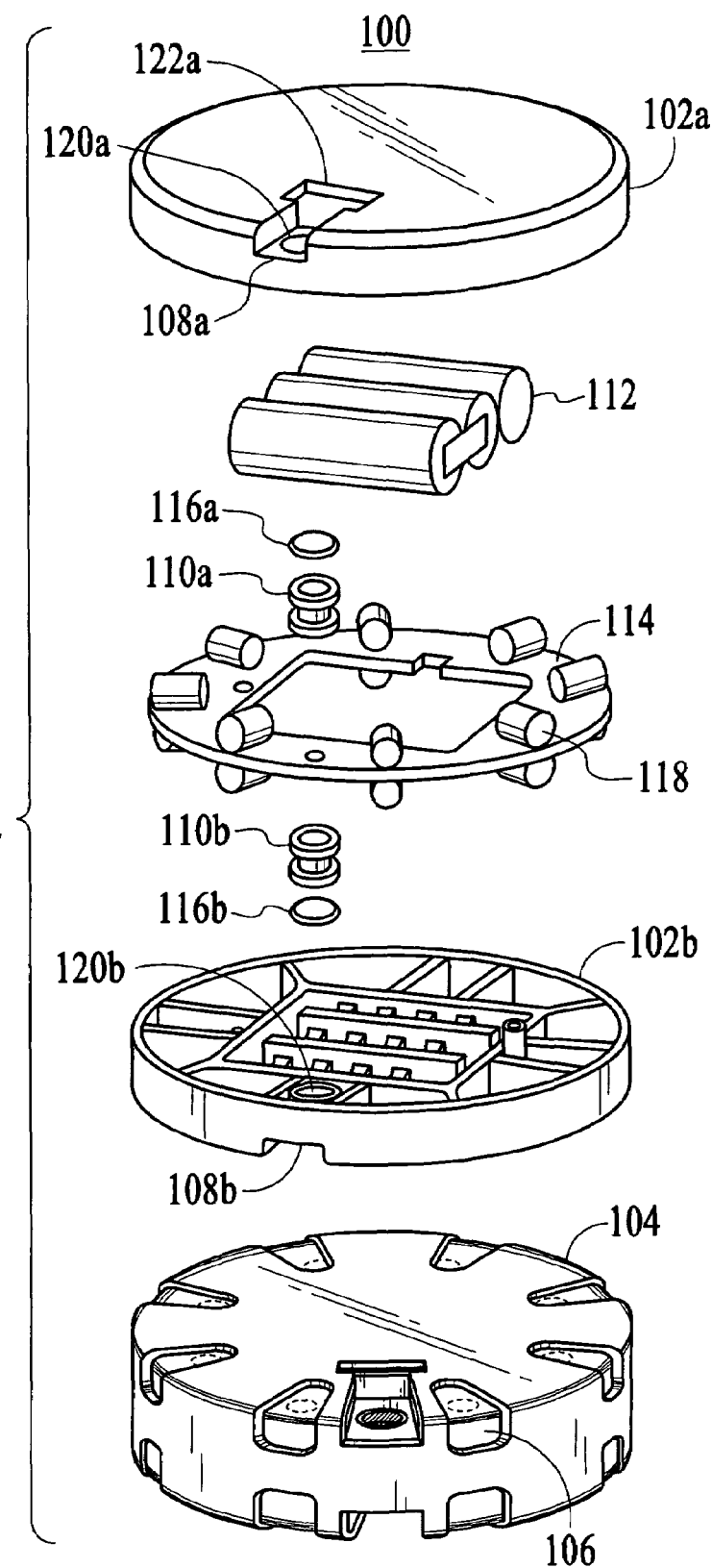

Isometric View

Top View

Bottom View

Front View

Back View

Left View

Right View

Powerflare Niminal Implementation

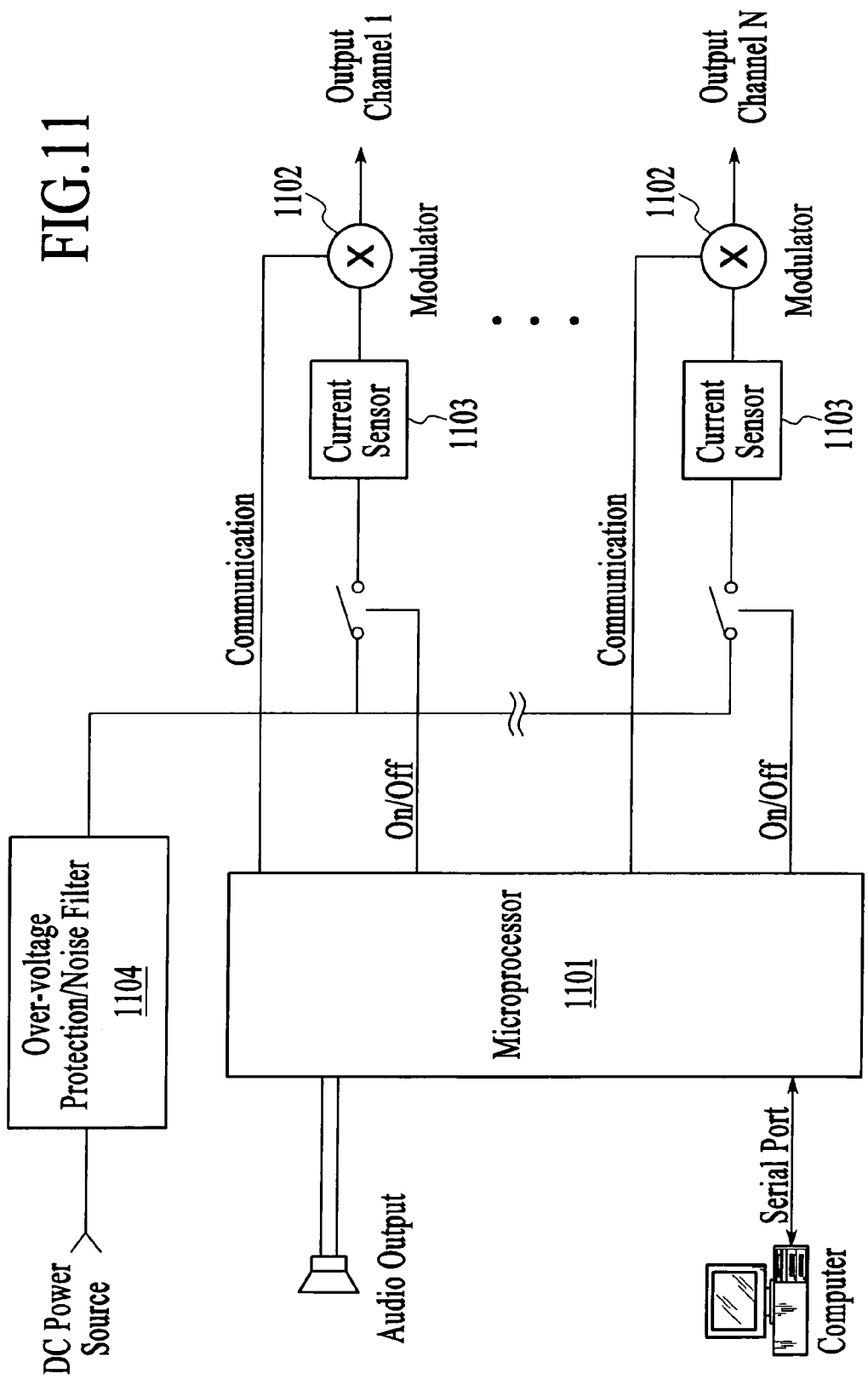

RUGGEDIZED ILLUMINATING, MARKING, OR SIGNALING DEVICE AND SYSTEM

CROSS-REFERENCE TO RELATED APPLICATIONS

This application claims priority from co-pending U.S. Provisional Patent Application Ser. No. 60/426,248, entitled "Ruggedized Electronic Traffic Safety Device and Automated Vehicle Deployment System," filed on Nov. 13, 2002.

This application is related to co-pending regular U.S. patent application Ser. No. 10/712,714 entitled "Deployment System for Ruggedized Illuminating, marking, or Signaling Device, filed on Nov. 12, 2003.

FIELD OF THE INVENTION

The present invention relates to electronic devices, and more particularly to illuminating, marking, or signaling electronic devices.

BACKGROUND OF THE INVENTION

Various illuminating, marking, and/or signaling electronic devices exist in the safety industry. For example, law enforcement officers use strobes to increase the visibility of their vehicles. Incendiary flares are chemical devices that often mark roads at the scene of an accident or road closures. Various illuminating devices are also used on cones, barricades, and buoys as markers. Illuminating devices are also commonly used in sports, such as lights for bicycles and motorcycles.

However, these conventional illumination devices have numerous shortcomings:

Mechanically Frail: The devices generally cannot withstand the rigors of heavy use, such as being run over by large trucks, and the devices cannot withstand sustained exposure to harsh environments or hazardous materials. The failure of such devices eliminates the cost savings that might otherwise have been realized.

Poor Power Management: Most products use non-rechargeable power sources, requiring the user to frequently replace the power source or the product itself, introducing uncertainty as to the readiness of the unit. Many products that use rechargeable power sources manage the stored power inefficiently.

Inadequate Optical Visibility: The devices do not have enough visibility to be used in daylight and even nighttime performance is subpar.

Ergonomics: Some of the devices are too bulky, require alkaline batteries that are a maintenance hassle, and require manual activation.

For example, the use of incendiary flares poses numerous problems: they are a serious fire hazard and cannot be used in areas where dry brush or other hazardous or flammable materials are present; they can become chemically unstable over time; they are difficult and dangerous to deploy as a police officer must stand in the road while igniting the flares, sometimes exposed to high-speed traffic and poor visibility; they are susceptible to moisture as well as temperature changes; they are bulky; they have a limited burn time; they are conventionally manufactured with toxic materials; and they are expensive.

Accordingly, there exists a need for an improved illumination device and system. The improved device and system should be easy and safe to use for illumination, marking, and signaling in a variety of applications. They should also be durable and cost effective. The present invention addresses such a need.

SUMMARY OF THE INVENTION

An illumination device, including: a shell with a plurality of sides, where the device can be positioned upon a surface or attached or suspended from any of the plurality of sides; and at least one light-emitting device within the shell, where when the device is positioned upon a surface or attached or suspended from any of the plurality of sides of the shell, light from the at least one light-emitting device emits through each of the plurality of sides of the shell. The device is thus easy to deploy and use. Its design is compatible with outsourced manufacturing, allowing for cost savings. The device can be reused many times, and its external coloring or color pattern can be designed for the application. The devices have a means to communicate internally and externally, forming a network. The device can also emit light for many hours longer and has ruggedness that far exceeds conventional devices. The device can also be used where conventional devices and other lighting devices cannot, including underwater and in the presence of hazardous materials.

BRIEF DESCRIPTION OF THE FIGURES

FIG. 2 illustrates an exploded view of the first preferred embodiment of illumination device in accordance with the present invention.

FIG. 11 illustrates a preferred embodiment of power management electronics for the charger for the illumination device in accordance with the present invention.

DETAILED DESCRIPTION

Figure 1A:
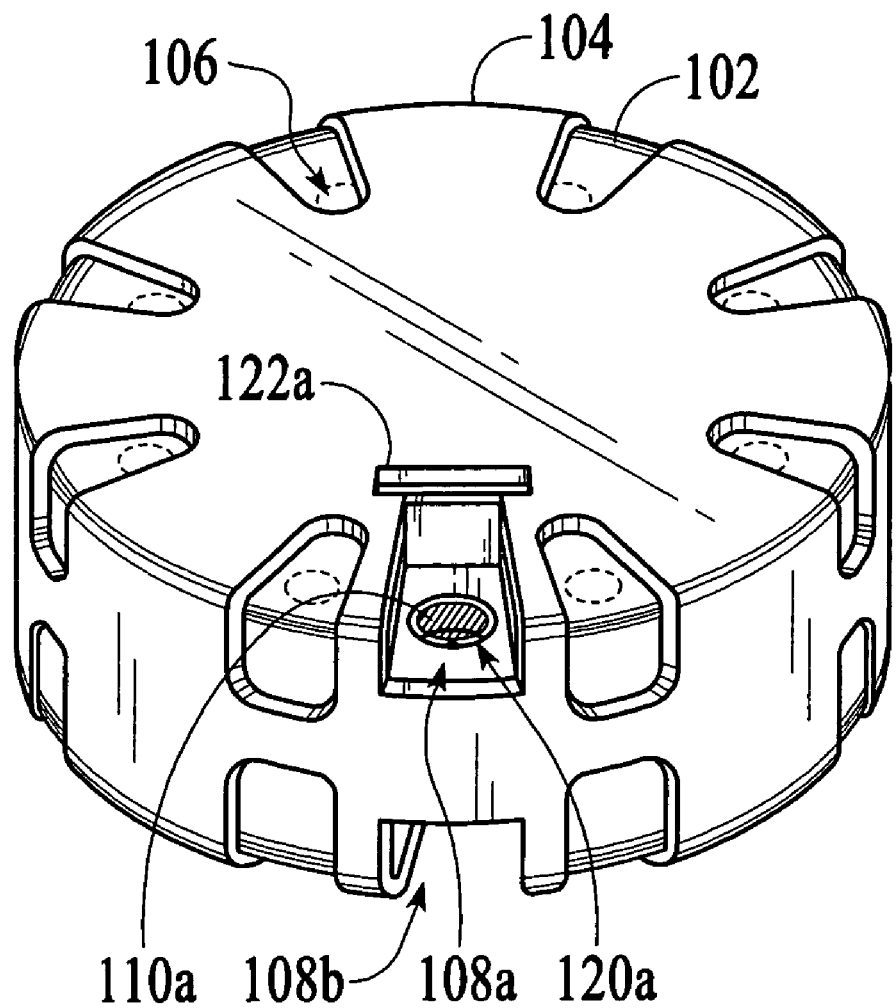
FIGS. 1A–1G illustrate an isometric, top, bottom, front, left, right, and back views, respectively, of a first preferred embodiment of an illumination device in accordance with the present invention.
Figure 1B:
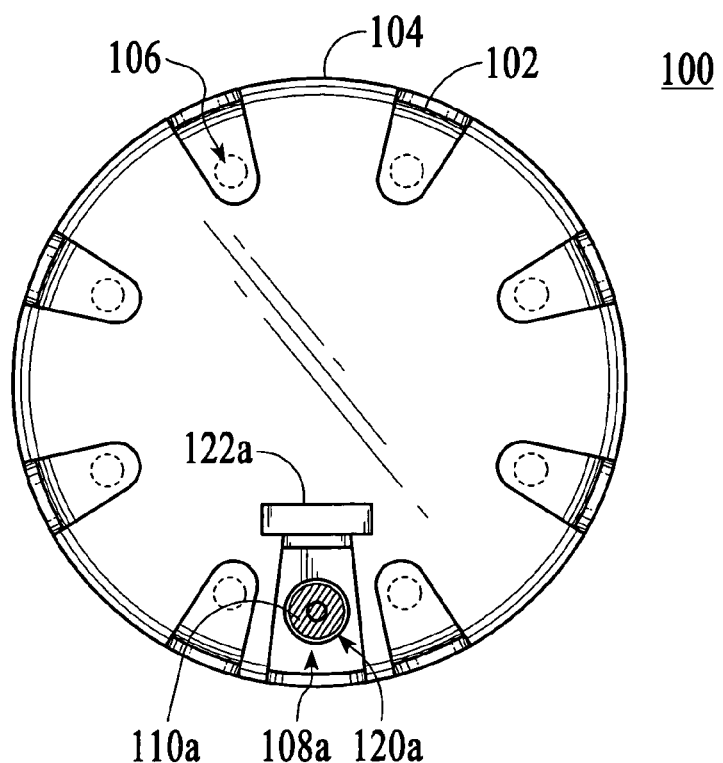
Figure 1C:
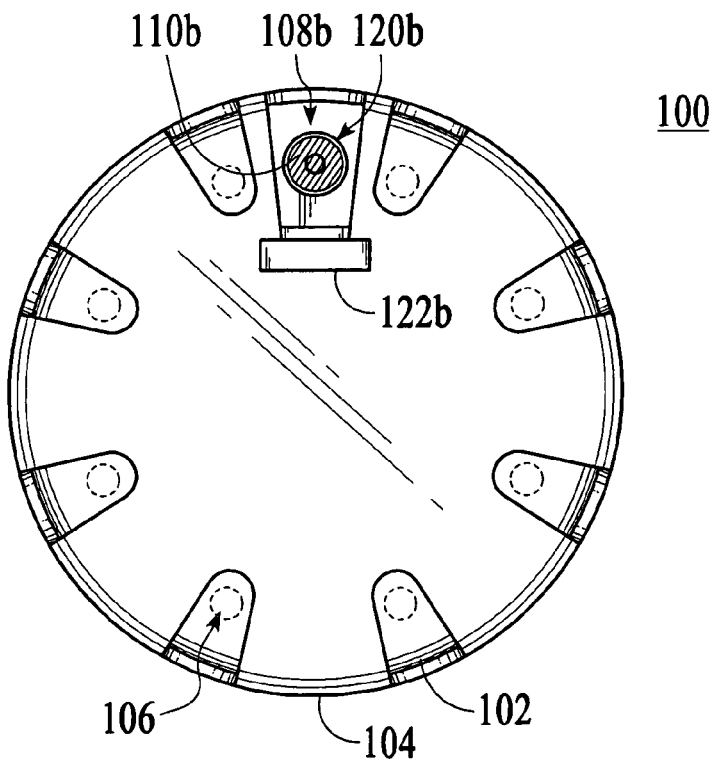
Figure 1D:
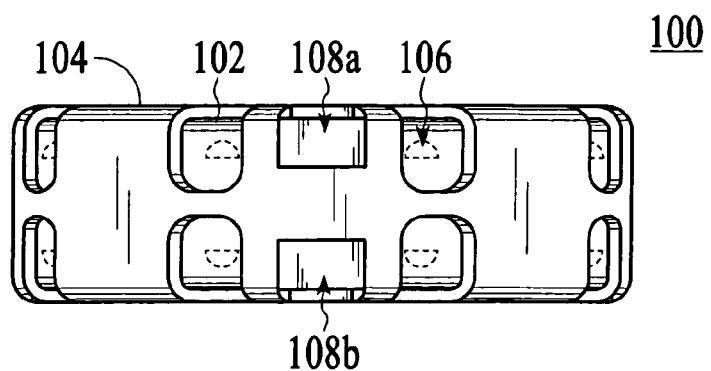
Figure 1E:
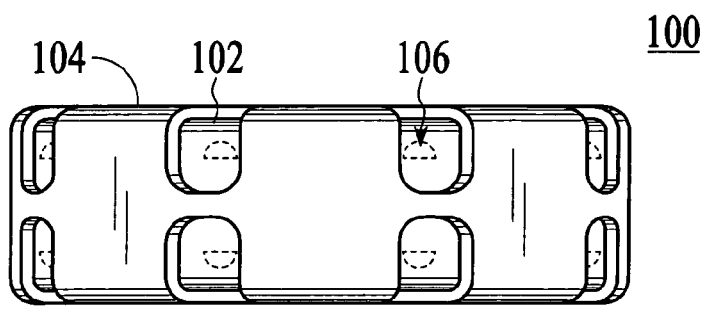
Figure 1F:
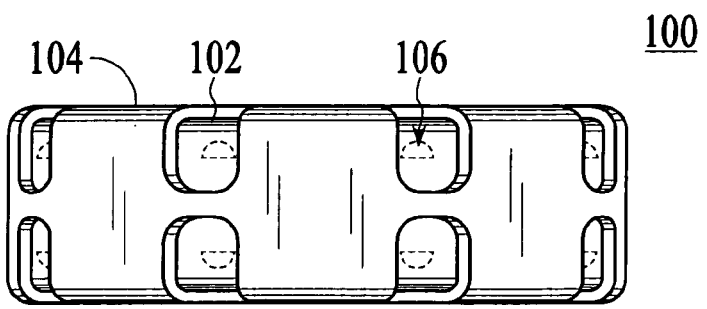
Figure 1G:
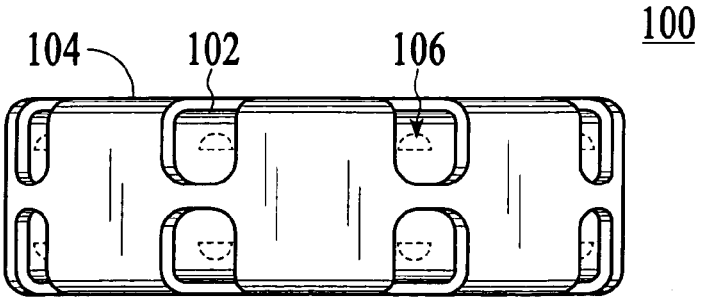

The present invention provides an improved illumination device and system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1A through 11 in conjunction with the discussion below.

FIGS. 1A–1G illustrate an isometric, top, bottom, front, left, right and back views, respectively, of a first preferred embodiment of an illumination device in accordance with the present invention. The device 100 comprises an inner shell 102 and an outer layer 104 encasing the inner shell 102. In the first preferred embodiment, the inner shell 102 is clear. The outer layer 104 comprises windows 106 through which light-emitting devices (not shown) within the inner shell 102 may emit light. "Light", as used in this specification, refers to any wavelength of light, including but not limited to visible and infrared light. The device 100 further comprises notches 108a–108b on inner shell 102. "Notches", as used in this specification, refer to one or more grooves, channels, fins, wedges, or other structures that aid in alignment, guiding, or coupling of the device 100. Within each notch 108a–108b are holes 120a–120b in the inner shell 102. Residing within each hole 120a–120b is a contact 110a–110b. In the first preferred embodiment, an energy source (hidden) residing within the inner shell 102 is used to power the device 100. If the energy source is a rechargeable power source, then the contacts 110a–110b provide electrical connections between a charger (not shown) and the device 100 to recharge the energy source. The charger for the device 100 is described further below in reference to FIGS. 8 through 10C. Proximate to the notches 108a–108b are pockets 122a–122b. The pockets 122a–122b allow various devices, such as chargers, barricade mounts, bike mounts, security cables, etc., to couple to the illumination device 100. For example, a device may comprise teeth that would engage the pockets 122a–122b, coupling the device to the illumination device 100.

In the first preferred embodiment, the device 100 is shaped like a cylinder or "puck", about 4 inches in diameter and 1.15 inches in height. Preferably, the height is minimized to enhance mechanical strength. Other shapes and dimensions are possible without departing from the spirit and scope of the present invention. In addition, the device 100 may be substantially symmetrical, with the top and bottom halves of the device 100 having identical features. Any of the surfaces of the device can rest upon a surface, such as a road, with each side emitting light. This allows the device 100 to be equally usable on each side, increasing its ease of use. For example, a police officer may deploy the device 100 onto a road without being concerned about which side of the device 100 faces upwards.

FIG. 2 illustrates an exploded view of the first preferred embodiment of the illumination device in accordance with the present invention. As illustrated in this view, the inner shell 102 of the device 100 may comprise two substantially symmetrical halves 102a and 102b. Residing within the two halves 102a–102b include the energy source 112, a printed circuit board (PCB) 114, and one or more light-emitting devices 118 coupled to the PCB 114. The light-emitting devices 118 can emit visible light, infrared light, or light of other wavelengths. The light-emitting devices 118 may be selected for their optical radiation pattern, and be positioned and spaced to provide uniform illumination about the circumference of the device 100. The windows 106 of the outer layer 104 are also positioned and spaced to facilitate this uniform illumination. Each light-emitting device 118 may be angled to emit light in a range, such that the entire circumference of the device 100 is illuminated. One or more sides may emit less light than other sides in device 100, as the optical radiation pattern may be adjusted for the desired application. In the first preferred embodiment, discrete light emitting diodes (LEDs) are used. However, other light-emitting, light-guiding, and optical beam shaping devices may be used without departing from the spirit and scope of the present invention. For example, a waveguide or surface-mounted emitters may be used. A laser source, a fluorescent tube, a strobe light, or an incandescent bulb may be used. Other optical components, such as refractive or diffractive lenses, may be added to enhance the light emission. In addition, other types of circuits may be used other than a PCB. For example, a flex circuit board may be used. The inner shell 102 may be a solid piece with embedded light emitting devices and circuits suspended within the piece, the shell being filled with a gel, a fluid, or a compound that hardens after filling the shell. Also, the energy source 112 can be any type of energy-providing mechanism, such as rechargeable batteries, alkaline batteries, solar cell, or an inductive power source. Alternatively, the energy source 112 may be omitted, and an external power source may be used. Also residing within the inner shell 102 are the contacts 110a and 110b. One contact 110a resides within a hole 120a of one half 102a of the inner shell 102. The other contact 10b resides within a hole 120b of the other half 102b of the inner shell 102. The contacts 110a–110b provide electrical contacts between the energy source 112 and a charger (not shown) via the PCB 114, if the energy source 112 is a rechargeable power source. If the energy source 112 is not of the type that requires charging, then the contacts 110a–110b, holes 120a–120b, and o-rings 116a–116b may be omitted. In the preferred embodiment, the contacts 110a–110b protrude slightly above the inner surface of the notches 108a–108b to ensure proper electrical contact with the charger. Each contact 110a–110b comprises one or more indentation about its circumference, within which o-rings 116a–116b may reside, respectively. The o-rings 116a–116b provide seals between their respective contacts 110a–110b and the walls of the holes 120a–120b.

The two halves 102a–102b of the inner shell 102 and the components residing within are surrounded by the outer layer 104. In the first preferred embodiment, the outer layer 104 is provided by placing the assembled inner shell 102 and components into an injection mold or over-mold, and injecting a material into the mold. The material is heated such that it chemically bonds with the surface of the inner shell 102, forming a seal. The outer layer 104 is thus formed as a single piece that seals the contact region between the two halves 102a–102b of the inner shell 102. In the preferred embodiment, the material for the outer layer 104 is rubber or a flexible plastic, which not only seals and protects the inner shell 102, but also prevents the device 100 from sliding when hit or run over by moving objects. Also, the outer layer 104 can be of a color that enhances its visibility, such as a fluorescent color, a reflective color, or a retroreflective pigment. In some applications, the outer layer 104 may be a color that diminishes its visibility. Although the outer layer 104 is described as being provided using an injection or over mold, other means of providing the outer layer 104 may be used. For example, the outer layer 104 may be provided as two separate pieces, coupled by an o-ring. Ultrasonic welding, epoxy, or spinning the two pieces to create heat may be used to seal them, or some other coupling means may be used. In addition, although the outer layer 104 is described above as having windows 106, other configurations of openings for the purpose of allowing light to emit from the device 100 may be used. The outer layer 104 may be clear so that no openings in the outer layer 104 are needed to create windows.

Figure 3:
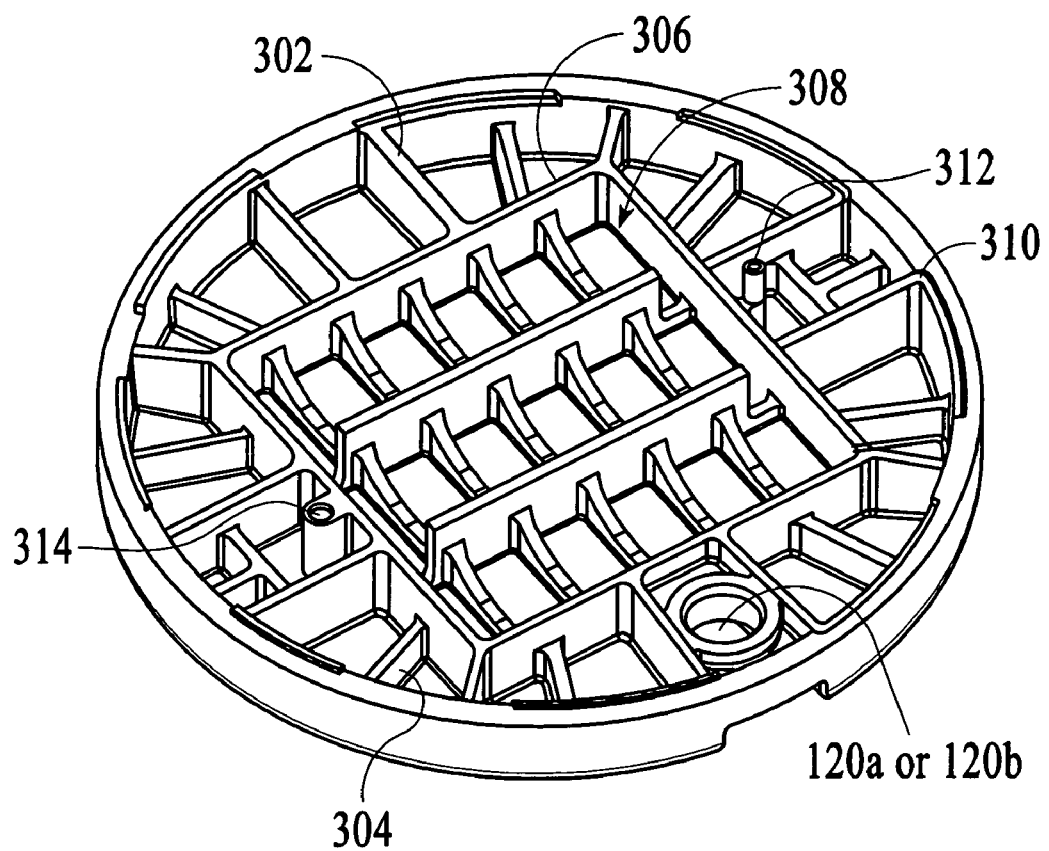
FIG. 3 illustrates in more detail one half of the inner shell of the illumination device in accordance with the present invention.

FIG. 3 illustrates in more detail one half of the inner shell 102 of the device 100 in accordance with the present invention. In the preferred embodiment, the halves 102a–102b are substantially identical. Thus, the illustrated half of the inner shell 102 may be either half 102a or 102b. Each half of the inner shell 102 comprises a plurality of primary ribs 302 which provide rigidity to the inner shell 102. The inner shell 102 also comprises a plurality of secondary ribs 304, which provide additional rigidity where needed or desired. The combination of the primary ribs 302 and the secondary ribs 304 enhance the rigidity of the device 100 without increasing its wall thickness. A maximum wall thickness may be imposed by an injection molding process. The height of the secondary ribs 304 are such that clearance for the PCB 114 and other electronics are provided. Also, they are placed in regions that do not interfere with the other components within the inner shell 102. When assembled, the primary ribs 302 of the two halves 102a–102b of the inner shell 102 sandwich the PCB 114 to prevent the PCB 114 from shifting.

A set of ribs 306 are provided proximate to the center of the inner shell 102 to prevent bowing of the inner shell 102 at the center. These ribs 306 also form a cavity 308 within which the energy source 112 resides. The height of the ribs 306 are approximately the same as the primary ribs 302. Within the cavity 308 are more ribs 310 to support the energy source 112. When assembled, the ribs 310 within the cavity 308 in one half 102a of the inner shell 102 contact the ribs 310 within the cavity 308 in the other half 102b of the inner shell 102. Although the preferred embodiment is described with the illustrated configuration of ribs, one of ordinary skill in the art will understand that other configurations are possible without departing from the spirit and scope of the present invention. In fact, the device in accordance with the present invention can be a solid piece with no ribs at all. It can also comprise a liquid, gel, or some other compliant inner material, within which a circuit board resides.

Each half 102a–102b of the inner shell also comprises a hole 120a within which a contact 110a resides. To assist in coupling the two halves of the inner shell 102, each half has a peg 312 and a peg hole 314. The peg 312 of one half fits within the peg hole 314 of the other half. The inner shell can also comprise a latch (not shown) or additional ribs and grooves or notches that enhance the robustness of the coupling of the two halves 102–102b. The final sealing of the two halves 102a–102b is provided by the outer layer 104, as described above.

Figure 4:
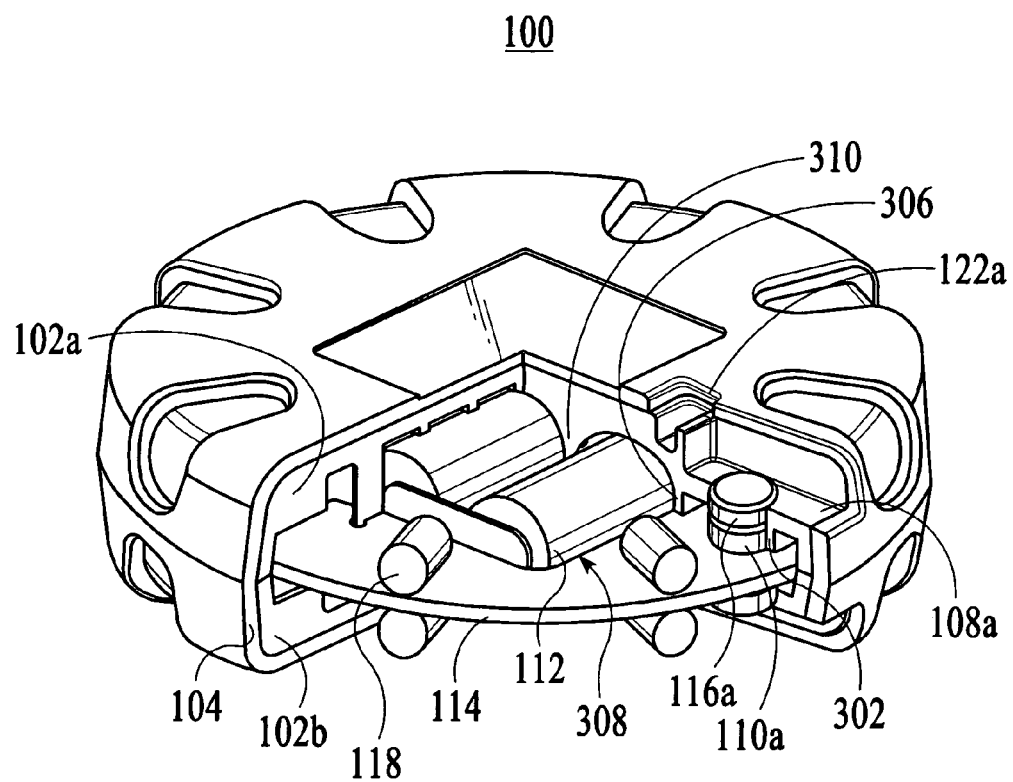
FIG. 4 illustrates a cut away view of the assembled illumination device in accordance with the present invention.
Figure 5A:
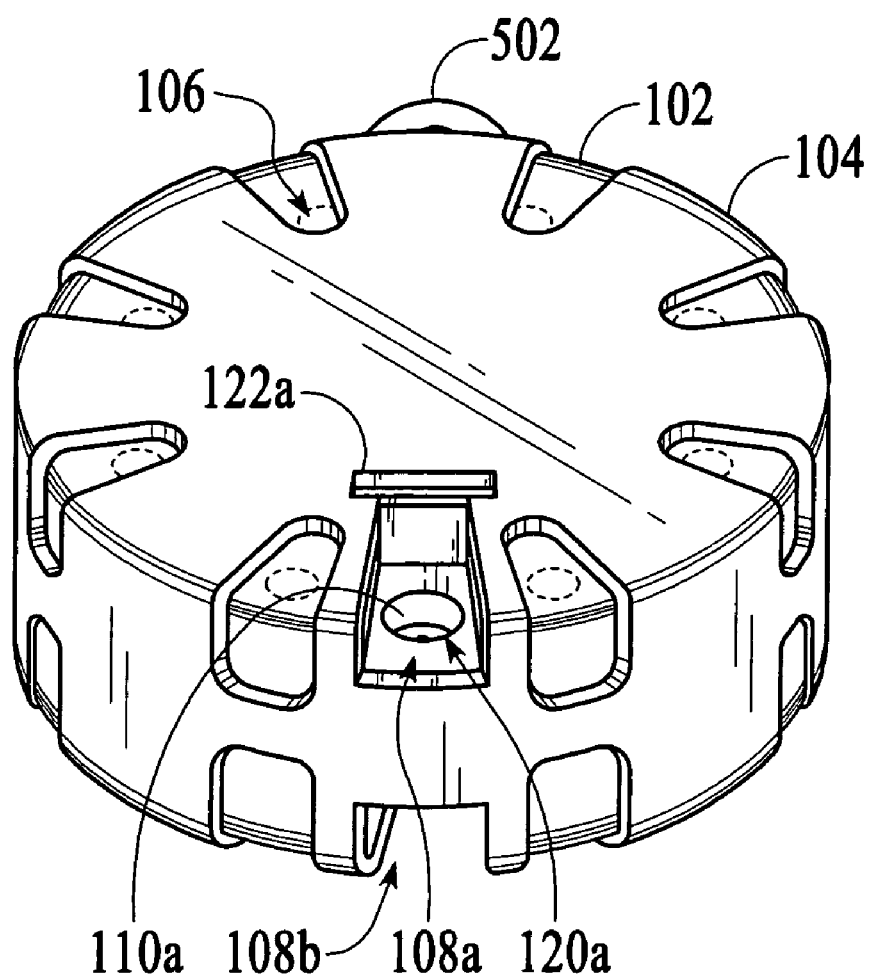
FIGS. 5A–5G illustrates an isometric, top, bottom, front, back, left, and right views, respectively, of a second preferred embodiment of an illumination device in accordance with the present invention.
Figure 5B:
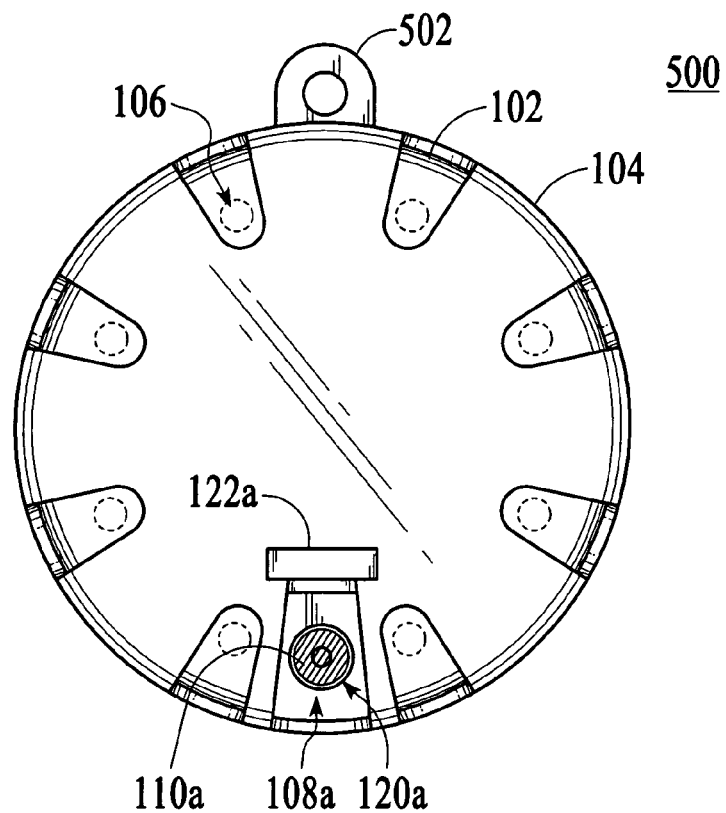
Figure 5C:
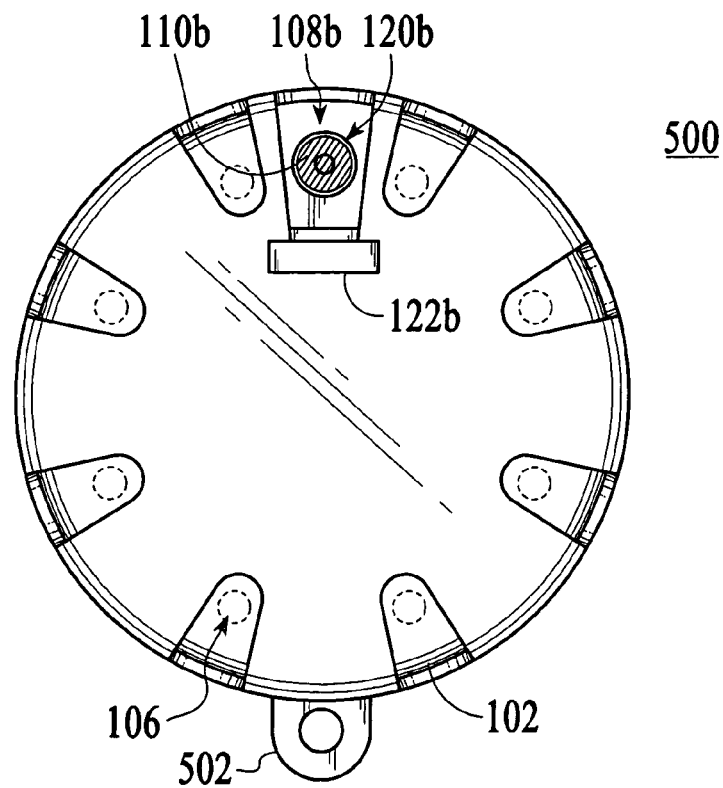
Figure 5D:
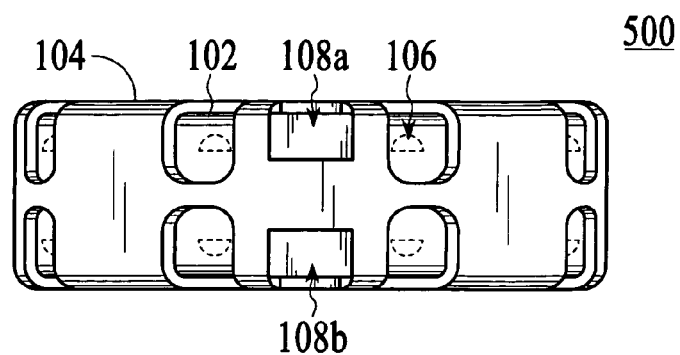
Figure 5E:
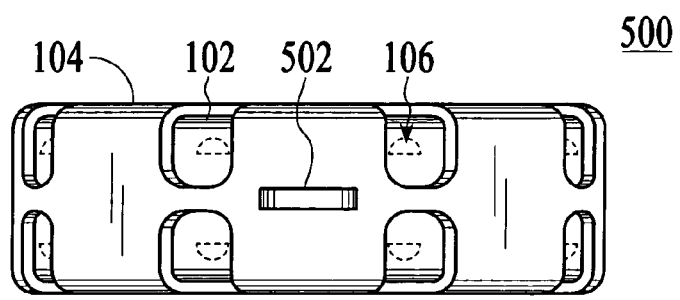
Figure 5F:
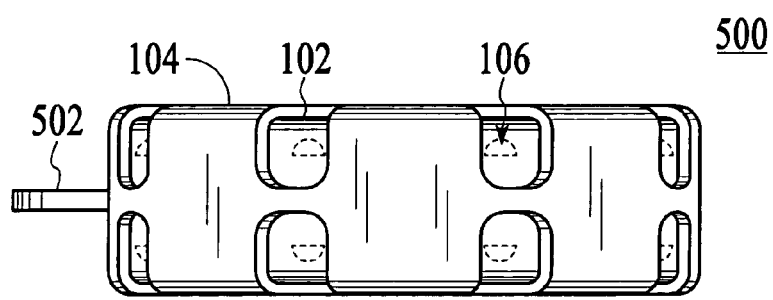
Figure 5G:
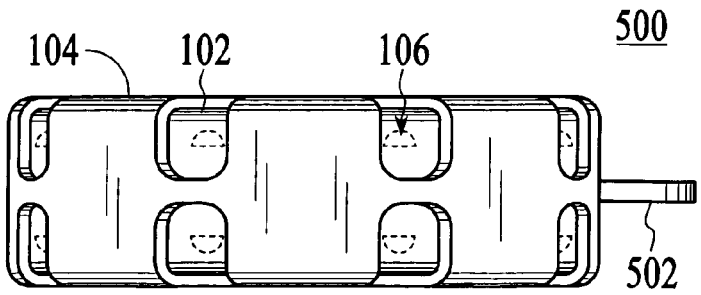

FIG. 4 illustrates a cut away view of the assembled illumination device 100 in accordance with the present invention. This view illustrates the primary ribs 302, the ribs 306 forming the cavity 308, the energy source 112 residing within the cavity 308, and the ribs 310 within the cavity 308. This view also illustrates the PCB 114 with the light emitting devices 118, the inner shell 102, and the outer layer 104, along with the contacts 110a–110b coupled to PCB 114, and o-rings 116a–116b as they reside within the inner shell 102. (Contact 110b and o-rings 116b are hidden in FIG. 3.)

FIGS. 5A–5G illustrate an isometric, top, bottom, front, back, left, and right views, respectively, of a second preferred embodiment of the illumination device in accordance with the present invention. The second preferred embodiment of the device 500 comprise the same components as the first preferred embodiment of the device 100, except for the addition of a loop 502 to the outer layer 104. For the sake of brevity, the description of the common components will not be repeated here. A wire, rope, lanyard, pin, dowel, etc. can be inserted through or at the loop 502, or a clamping or adhesive device attached to loop 502, such that the device 500 can hang or be otherwise positioned.

Other manners of positioning the device 100 or 500 are possible. For example, a clip (not shown) which couples to the device 100, 500 at or near the alignment features 108a–108b and pockets 122a–122b can be used.

Figure 6:
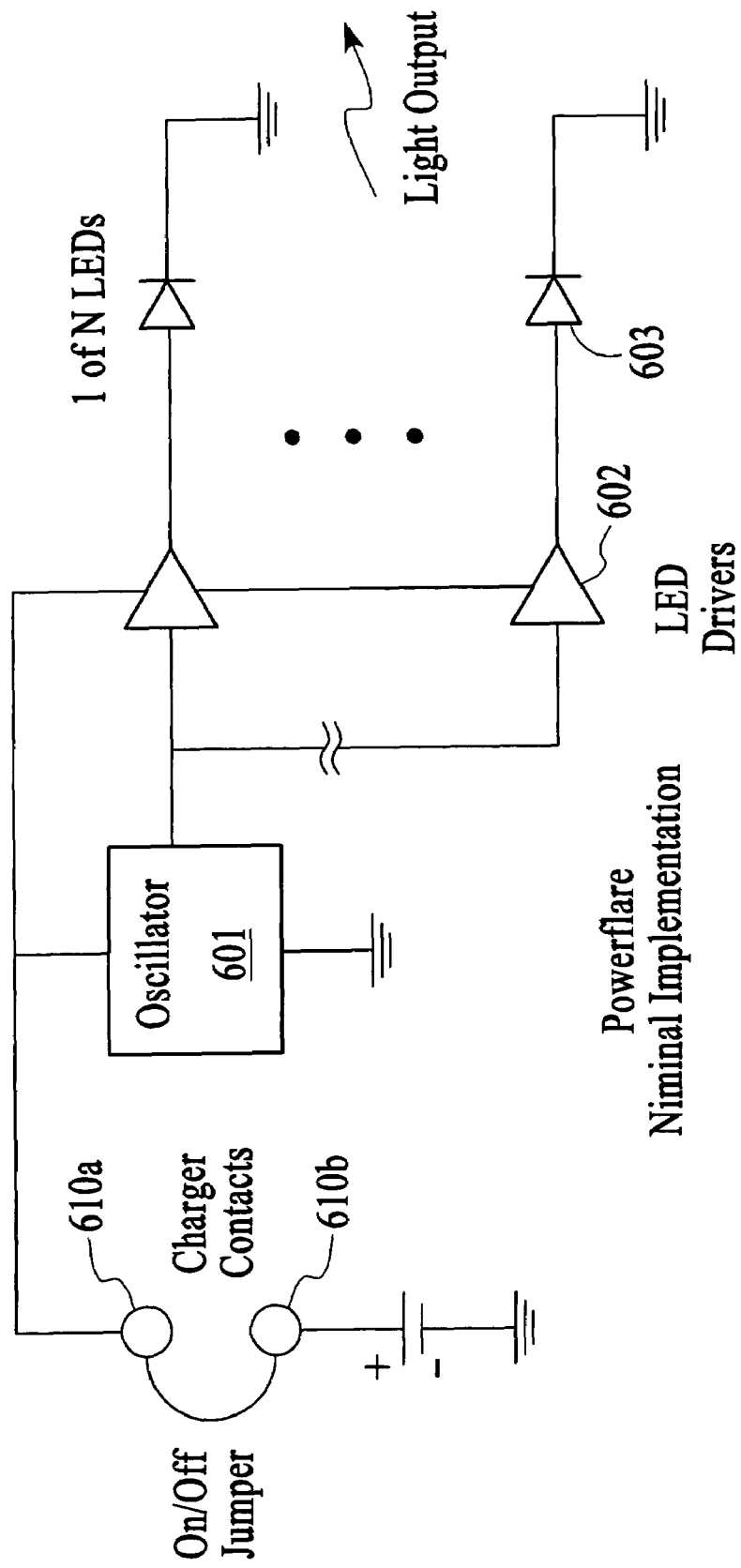
FIG. 6 illustrates a first preferred embodiment of power management electronics for the illumination device in accordance with the present invention.

FIG. 6 illustrates a first preferred embodiment of power management electronics for the illumination device in accordance with the present invention. The electronics comprises an oscillator 601 that provides a waveform to the LED drivers 602, which in turn provides the outputs 603 to the light-emitting devices 118. The electronics are powered by a voltage source. The contacts 610a–610b can also be used to turn the device 100, 500 on and off.

Figure 7:
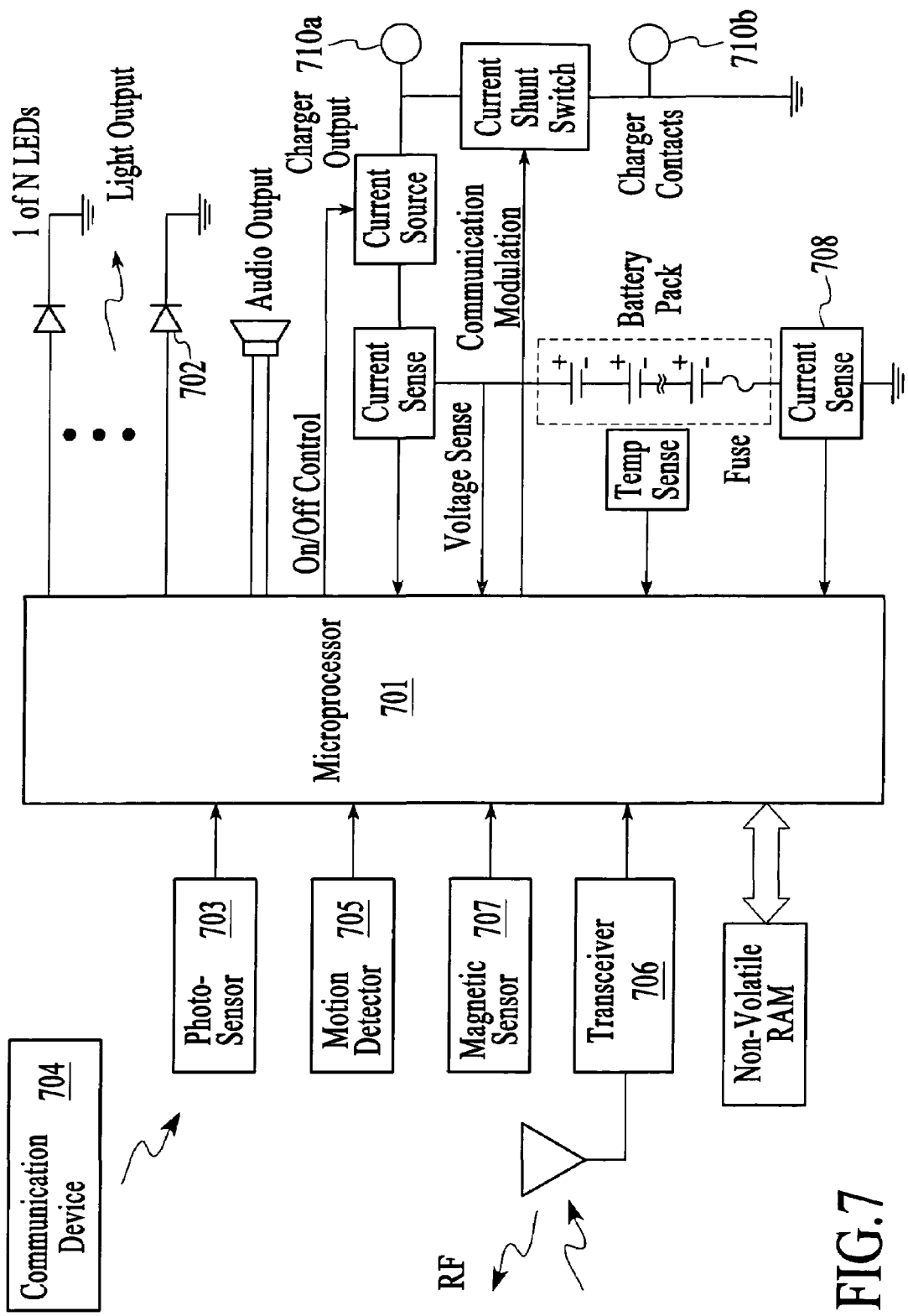
FIG. 7 illustrates a second preferred embodiment of power management electronics for the illumination device in accordance with the present invention.

FIG. 7 illustrates a second preferred embodiment of power management electronics for the illumination device in accordance with the present invention. The electronics comprises a programmable microprocessor 701. The microprocessor 701 has a plurality of outputs, one for each light-emitting device 118, where the outputs control each light-emitting device 118 independently. By controlling the light-emitting devices 118 in this manner, any flashing or signaling pattern can be implemented. The electronics has a suite of sensors and controls as described below.

The photosensor 703 may be used to monitor the ambient light and adjust the intensity of the light-emitting devices 118 accordingly. For example, during daylight, the light-emitting devices 118 may be driven to maximum intensity to increase visibility, while during the night, their intensity may be reduced so as not to unnecessarily distract or blind a viewer. Reduced optical output also reduces power consumption, thus increasing the lifetime of a non-rechargeable battery, or it increases the run time between charges of a rechargeable battery, if a battery is used as energy source 112. The photosensor 703 can further function as a communication receiver. With the use of a light-based communication device 704, modulated light encoded with configuration or other information can be transmitted to the device 100, 500. The device 100, 500 can use at least one of its light-emitting devices 118 to respond by sending data back to the communication device 704. This function is especially useful as it allows for field programmability in certain situations. For example, it is useful in targeting, "arming" a motion sensor, or configuring a synchronized cluster of devices 100, 500.

The motion detector 705 is a micro-electromechanical system-based accelerometer or an optical-based motion detector used to detect tampering or motion. For example, in traffic control applications, once a plurality of the devices 100, 500 are deployed, the motion detector 705 can be used to detect potential theft. A siren or speaker can then be enabled to deter such theft. For another example, in targeted marking applications, the motion detection can be used to disable the device 100, 500 or enable an alarm whenever unauthorized movement is sensed.

The radio frequency (RF) transceiver 706 is a two-way communications link for controlling a network of devices 100, 500. Using this functionality, a plurality of the devices 100, 500 can be synchronized to emit particular light patterns. This can enhance visibility of the devices 100, 500 in traffic control, landing zone markings, or other such applications. Additionally, the RF transceiver 706 can be used to transmit warnings to a user's pager or similar device that a possible theft or tampering has occurred.

The magnetic sensor 707 functions as a communication port. Using a permanent magnet or electromagnet, the device 100, 500 can be sequenced through a series of pre-defined states (e.g., different flash patterns and the off state). Also, using a higher-speed electromagnetic device, the device's operational modes can be re-programmed in a similar manner as with the light and RF sensor inputs, described above.

The contacts 710a–710b may be used to recharge energy source 112. They may also be used as an external switch to activate or deactivate the circuitry, or to convey information to the device 100, 500. For example, the light output 702 may be activated when contacts 710a–710b are electrically coupled.

The internal sensors 708 comprise a plurality of sensors for monitoring the state of the energy source 112, both during normal operation and during charging. It is particularly important when high energy density batteries are used as the energy source 112. For monitoring an input voltage from a charger and modulating the input current, a two-way communications link is established between the device 100, 500 and the charger. This guarantees that only a matching charger can be used, which functions as a theft deterrent. The two-way communications link can also be used as a smart link for production testing, ID code downloading, flashing pattern configuration, etc. By monitoring the energy source's temperature, voltage, and current, the microprocessor 701 can uniquely charge any type of energy source chemistry as well as optimize the charging algorithm to complement the sometimes irregular use of the device 100, 500.

In the preferred embodiment, the device 100, 500 automatically turns on when it senses that it is no longer attached to its charger. Alternatively, the device 100, 500 can be turned on when it receives an external signal via its communications port, or when its motion detector 705 or accelerometer detects that it has been deployed. The motion detector 705 or accelerometer may be internal or external to the device 100, 500.

Figure 8:
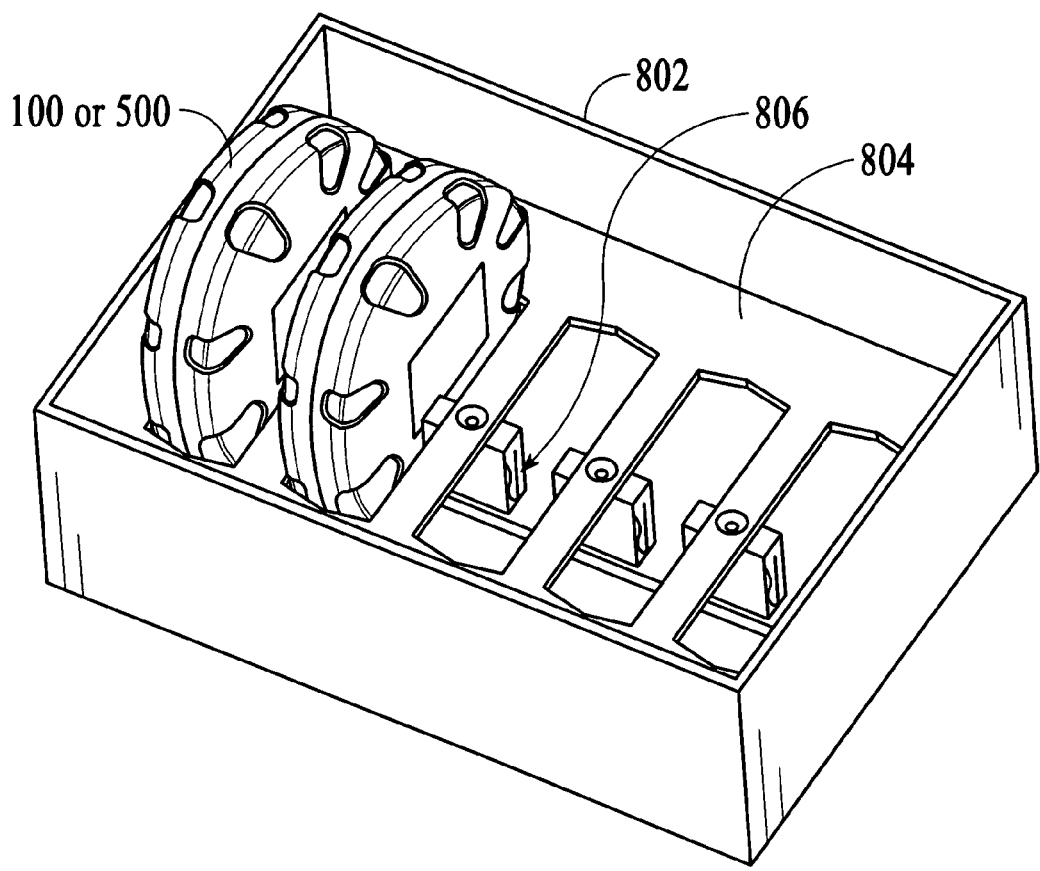
FIG. 8 illustrates a first preferred embodiment of a charger for the illumination device in accordance with the present invention.

FIG. 8 illustrates a first preferred embodiment of a charger for the illumination device in accordance with the present invention. The charger 800 comprises a housing 802 comprising a plurality of walls and an inner plate 804 with slots through which the devices 100, 500 may traverse. Under the inner plate 804 are the charging mechanisms 806. In the illustrated embodiment, five devices may be charged at the same time. In the preferred embodiment, the charger 800 is mounted in a vehicle's trunk and coupled to the vehicle's battery. However, it can reside elsewhere, including as a free standing device, without departing from the spirit and scope of the present invention.

Figure 9:
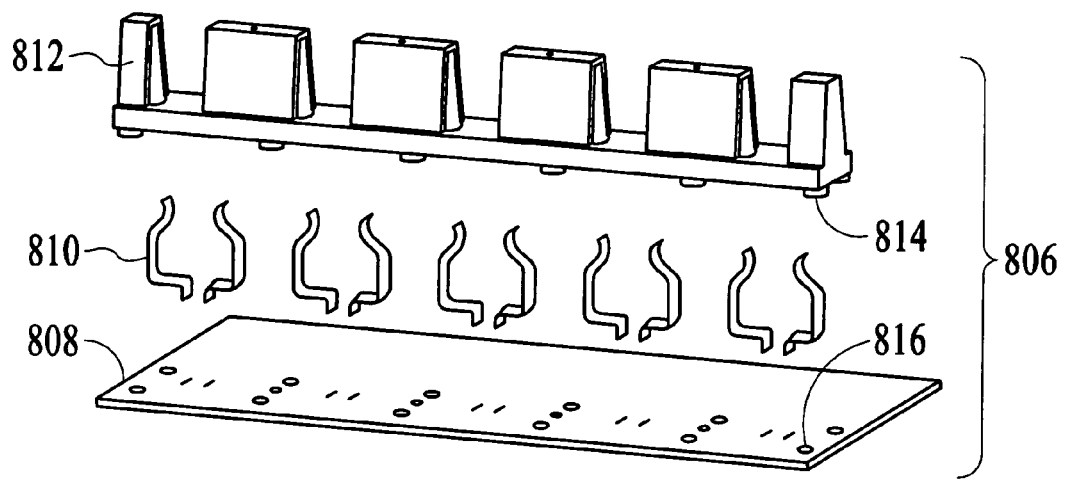
FIG. 9 illustrates an exploded view of the charging mechanism of the first preferred embodiment of the charger for the illumination device in accordance with the present invention.

FIG. 9 illustrates an exploded view of the charger mechanism of the first preferred embodiment of the charger for the illumination device in accordance with the present invention. The charging mechanism 806 comprises a PCB 808, one or more electrodes 810 for providing electrical contact between the contacts 110a–110b of the devices 100,500 and the PCB 808 of the charger 800, and guides 812 for engaging the notches 108a–108b on the devices 100, 500. Thus, the notches 108a–108b serve as alignment features, in addition to any other functions they may serve. Alternatively, other types of alignment features may also be used. In the preferred embodiment, the guides 812 have tapered shapes that match the tapered shape of the notches 108a–108b. The notches 108a–108b and their tapered shapes ensure that the devices 100, 500 can only be inserted into the charging mechanism 806 in the proper orientation. In the first preferred embodiment, the electrode 810 is a spring with two prongs. As the devices 100 are inserted, the two prongs of the springs are pushed apart. When the devices 100, 500 are fully inserted, the curved portions of the two prongs engage the contacts 110 of the devices 100, 500. The guides 812 can also have pegs or screws 814 that are inserted into reference holes 816 in the PCB 808 to assist in the assembly of the charger 800. They help to ensure that the guides 812 and the electrodes 810 are properly positioned on the PCB 808 to facilitate proper charging of the devices 100, 500. In the first preferred embodiment, the device 100, 500 can be set to automatically activate when removed from the charger 800.

Figure 10A:
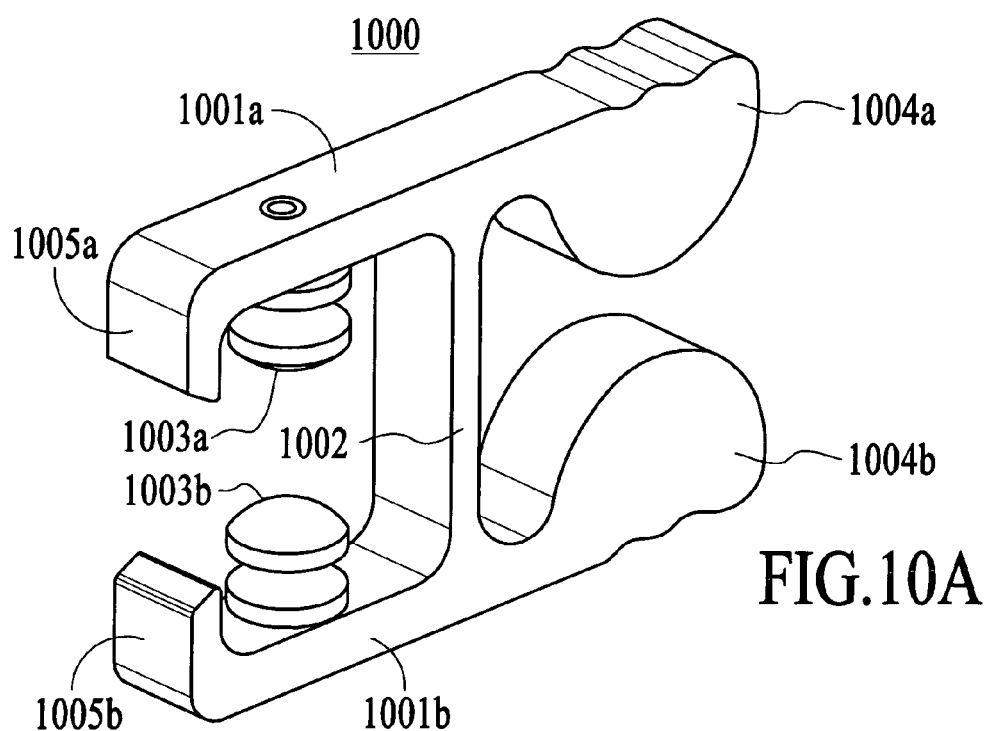
FIGS. 10A–10C illustrate a second preferred embodiment of a charger for the illumination device in accordance with the present invention.
Figure 10B:
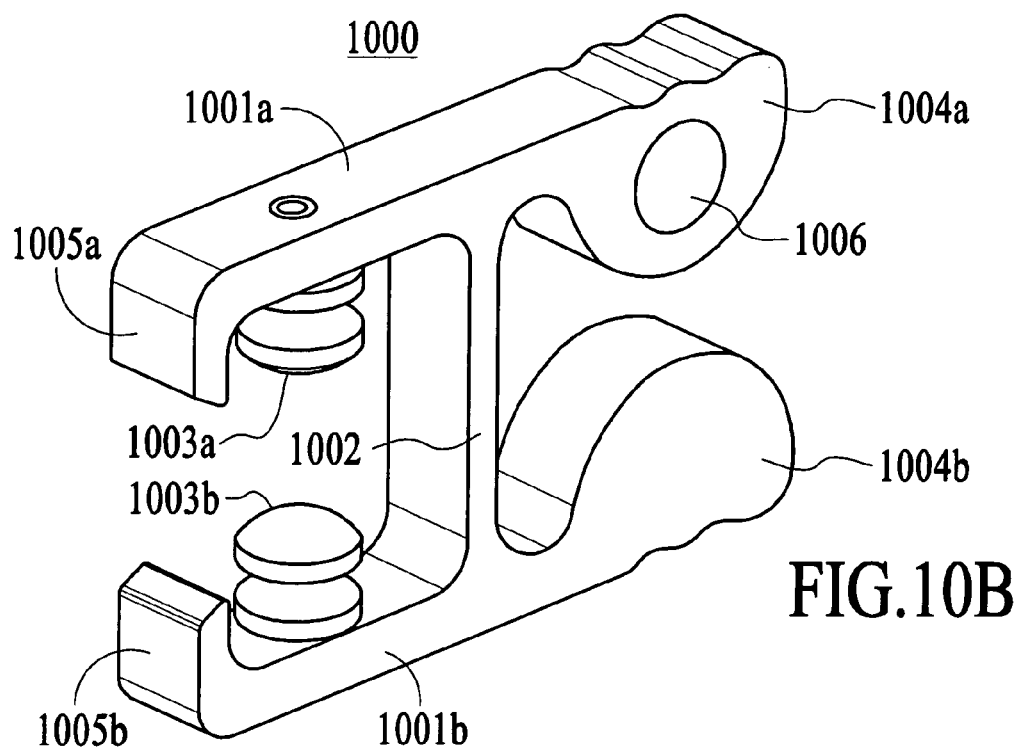
Figure 10C:
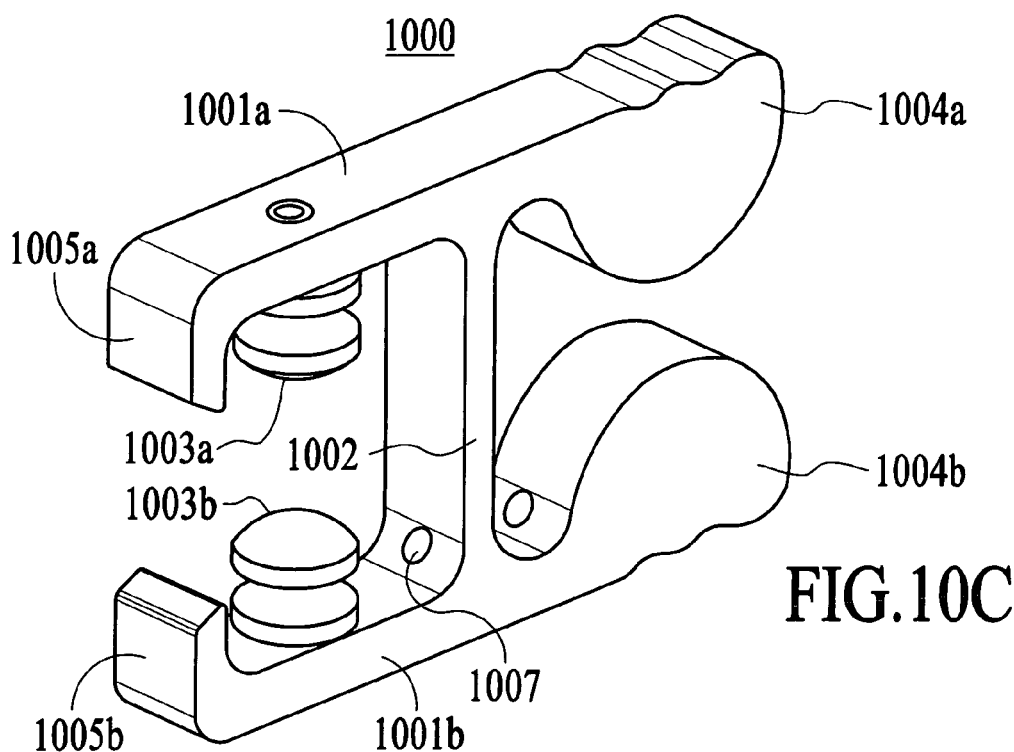

FIGS. 10A–10C illustrate a second preferred embodiment of a charger for the illumination device in accordance with the present invention. The charger 1000 comprises a first arm 1001a and a second arm 1100b, coupled together by a region 1002. At first ends of the first and second arms 1001a–1001b are contacts 1003a–1003b. At second ends of the first and second arms 1001a–1001b are grips 1004a–1004b. Also at the first end of the arms 1001a–1001b are teeth 1005a–1005b. A user may use the grips 1004a–1004b to move the second ends of the arms 1001a–1001b toward each other. This causes the region 1002 to flex, allowing the first ends of the arms 1001a–1001b to move away from each other. The charger 1000 may then be placed onto the illumination device 100, 500 such that when the user releases the grips 1004a–1004b, the teeth 1005a–1005b engage the pockets 122a–122b, respectively, on the device 100, 500, coupling the charger 1000 to the device 100, 500. The contacts 1003a–1003b of the charger 1000 would then form an electrical connection with the contacts 110a–110b of the device 100, 500. The contacts 1003a–1003b of the charger 1000 are electrically coupled to a power source (not shown) in any number of ways. For example, wires (not shown) may be soldered to the contacts 1003a–1003b.

Optionally, as illustrated in FIG. 10B, the charger 1000 may further comprise a magnet 1006, used as a switch to turn the device 100, 500 on and off. Although FIG. 10B illustrates the magnet 1006 as residing within the grip 1004a, the magnet 1006 may be placed elsewhere on the charger 1000 without departing from the spirit and scope of the present invention.

Optionally, as illustrates in FIG. 10C, the charger 1000 may further comprise holes 1007. If wires are used to electrically couple the contacts 1003a–1003b to a power source, the wires may traverse the holes such that they extend from the contacts 1003a–1003b, through the region 1002, and out of the charger 1000 to the power source. Other manners of placing the wires may be used without departing from the spirit and scope of the present invention.

As with the device 100, 500, power management can also occur at the first and/or second preferred embodiments of the charger 800, 1000. FIG. 11 illustrates a preferred embodiment of power management electronics for the charger of the illumination device in accordance with the present invention. The electronics comprises a microprocessor 1101 that controls the delivery of power to and from the energy source 112. In addition, the electronics comprises a voltage modulator 1102, current sensors 1103, and over-voltage protection 1104. The voltage modulator 1102 allows the charger to transmit information to the device 100, 500 being charged. The information is encoded onto the delivered power by adding a voltage-modulated component to the delivered power. The current sensors 1103 monitor the current delivered to the device 100, 500. The device 100, 500 can modulate the incoming current to encode data useful to the charging system, including identification and logged information, such as motion disturbances, etc. The current sensors 1103 are also used to determine if the charging circuit is outside the normal limits of use, and if so, the microprocessor 1101 may protect the energy source 112 from damage. For example, the microprocessor 1101 may cut the power being delivered to the energy source 112. This fail-safe mechanism is particularly important when high energy density batteries are used. The over-voltage protection 1104 prevents transients normally present on a vehicle's electrical system from damaging the charging electronics. Using the power management illustrated above in FIGS. 7 and 11, the ease of use of the device 100, 500 is enhanced. The user need not worry about the vehicle's batteries being discharged by the charger. The charger 800,1000 uses several efficient power conversion techniques to reduce the current drain from the vehicle battery. For example, the maximum current draw for five completely uncharged devices 100, 500 may be only about 1.5 amps. After about three hours of charging, when the devices 100, 500 are fully charged, the current draw will drop to less than 100 mA.

In addition, a vehicle battery safeguard can be built into the charging system. A voltage sensor can determine whether it is safe to drain power from the vehicle battery to charge the devices 100, 500. The charger 800, 1000 will cease charging if the vehicle battery voltage drops below the normal level. This feature is particularly important if more than one charger is connected to the same vehicle battery.

A plurality of devices 100, 500 can be used as part of a network of devices. In addition to facilitating communication between a charger and an individual illumination device 100, 500, the contacts 110a–110b can function as ports through which individual illumination devices 100, 500 can be synchronized or coordinated as part of the network. The network can be a Wide Area Network (WAN), a Local Area Network (LAN), a wireless network, or some other type of network. The network can be configured in any number of ways. For example, a device other than an illumination device can be used as a "master" device, coordinating the "slave" illumination devices 100, 500 in the network. Alternatively, one of the illumination devices 100, 500 in the network can function as the "master" device, while the other illumination devices 100, 500 in the network would function as "slave" devices. The light emitted by the devices 100, 500 can be modulated to accomplish communications to and/or between the devices 100, 500 in the network. Other signaling means can also be used, such as RF. For example, the master illumination device 100, 500 can emit an RF signal each time it flashes, while the other illumination devices 100, 500 in the network are in a receive mode, receiving the RF signal. By coordinating the illumination devices 100, 500 in this manner, the flash patterns of the devices 100, 500 can be coordinated in a manner that helps in directing traffic or in marking an area such as a helicopter landing zone. In the preferred embodiment, the circuitry required to facilitate the communication with a devices 100, 500 in the network, i.e., a receiver/transmitter or transceiver, antenna, etc., can reside internally within the device 100, 500. Alternatively, this circuitry and be external to the device 100, 500 and be made to couple to the communication port of the device 100, 500.

Other applications of the device 100, 500 include military, marine, sports, and other public safety uses. For example, the devices 100, 500 can be used in military applications as beacons or location markers. The light emitted by the device 100, 500 can be of wavelengths visible with night vision equipment, where the device 100, 500 is used as markers or for illumination. The light emitted by the device 100, 500 can be coded to mark a target or to communicate information. The coloring of the outside layer can be such that diminishes the visibility of the device 100, 500.

The devices 100, 500 can also be used in marine or aquatic applications. Because they are sealed, the devices 100, 500 can be used as dock lighting, buoy light, aqua-farm lighting, etc. The devices 100, 500 can also be made for underwater or diving applications as markers or illuminators.

Sports and public safety uses are also possible. For example, the devices 100, 500 can be used as safety lights for bicycles or motorcycles. Fire fighters can use them as "man down" beacons, as the light from the device 100, 500 may be seen through smoke. Many other applications are also possible without departing from the spirit and scope of the present invention.

An improved illumination device and system have been disclosed. The device comprises: a shell with a plurality of sides, where the device can be positioned upon a surface, attached or suspended at any of the plurality of sides; and at least one light-emitting device within the shell, where when the device is positioned upon a surface or attached or suspended at any of the plurality of sides of the shell, light from the at least one light-emitting device emits through each of the plurality of sides of the shell. The device is thus easy to deploy and use. Its design is compatible with outsourced manufacturing, allowing for cost savings. The device may be reused many times, and its external coloring may be made based on the application. The inventive device may also emit light for many hours longer than conventional devices. The inventive device has ruggedness that far exceeds conventional devices. Because the inventive device is sealed, it can be used where conventional devices and other lighting devices cannot, including underwater and in the presence of hazardous or flammable materials.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An illumination device, comprising:
    a shell comprising a plurality of sides, wherein the device can be positioned upon a surface or attached or suspended at any of the plurality of sides;
    at least one light-emitting device within the shell, wherein when the device is positioned upon a surface or attached or suspended at any of the plurality of sides of the shell, light from the at least one light-emitting device emits through each of the plurality of sides of the shell;

an energy source within the shell; and at least one contact capable of forming an electrical connection between the energy source and a charger, wherein the charger comprises:

a first arm and a second arm;

a region coupling the first and second arms, wherein the region flexes when a first end of the first arm and a first end of the second arm are moved toward each other;

a first contact at a second end of the first arm distal to the first end of the first arm; and a second contact at a second end of the second arm distal to the first end of the second arm, wherein the first and second contacts form the electrical connection between the charger and the energy source.

2. The device of claim 1, wherein the charger further comprises:

a first grip at the first end of the first arm; and a second grip at the first end of the second arm, wherein the first and second grips facilitate the moving of the first ends of the first and second arms toward each other.

3. The device of claim 1, wherein the charger further comprises:

teeth at the second ends of the first and second arms for engaging pockets in the shell.

4. The device of claim 1, wherein the charger further comprises:

a magnet functioning as a switch to turn the device on and off.

5. An illumination device, comprising:

a shell comprising a plurality of sides, wherein the device can be positioned upon a surface or attached or suspended at any of the plurality of sides;

at least one light-emitting device within the shell, wherein when the device is positioned upon a surface or attached or suspended at any of the plurality of sides of the shell, light from the at least one light-emitting device emits through each of the plurality of sides of the shell; and a communication port for transmitting a signal from the device and for receiving a signal from outside the device.

6. The device of claim 5, wherein the shell comprises a top half coupled to a bottom half.

7. The device of claim 6, wherein the top half and the bottom half are symmetrical.

8. The device of claim 5, wherein the shell comprises a plurality of primary ribs for providing rigidity.

9. The device of claim 8, wherein the shell further comprises a plurality of secondary ribs.

10. The device of claim 5, wherein the shell comprises a liquid or gel or solid material within the shell.

11. The device of claim 5, wherein the shell comprises at least one hole, wherein at least one electrical contact can reside within the at least one hole.

12. The device of claim 5, wherein the shell comprises at least one notch for engaging a charger, wherein at least one electrical contact can reside within the at least one notch.

13. The device of claim 12, wherein the device may automatically turn on when the device is disengaged from the charger.

14. The device of claim 5, wherein the shell comprises at least one notch or pocket for engaging a clip, wherein the shell can be positioned upon the surface or attached or suspended utilizing the clip.

15. The device of claim 5, further comprising a loop coupled to the shell, wherein the device can be suspended or attached or positioned utilizing the loop.

16. The device of claim 5, further comprising a circuit board within the shell, wherein the at least one light-emitting device is coupled to the circuit board.

17. The device of claim 5, further comprising an energy source within the shell.

18. The device of claim 17, wherein the energy source comprises one or more of the group consisting of:

a non-rechargeable power source;

a rechargeable power source;

at least one solar cell; and an inductive power source.

19. The device of claim 17, further comprising at least one contact capable of forming an electrical connection between the energy source and a charger.

20. The device of claim 19, wherein the at least one contact comprises an indentation about its circumference, wherein an o-ring can reside within the indention.

21. The device of claim 19, wherein the charger comprises:

a circuit board;

at least one electrode; and a guide, wherein a notch in the shell engages the guide, wherein when the notch engages the guide, the at least one electrode forms the electrical connection between the circuit board and the energy source.

22. The device of claim 21, wherein the at least one electrode comprises a spring.

23. The device of claim 5, further comprising an energy source external to the shell.

24. The device of claim 5, wherein a signal programming a pattern of light emission is received by the device utilizing the communication port.

25. The device of claim 5, wherein a signal programming the device in synchronization or cooperation with other devices in a network is received or sent by the device utilizing the communication port.

26. The device of claim 5, wherein the device receives a signal at its communication port to turn on or off.

27. The device of claim 5, further comprising signal communication circuitry external to the device and coupled to the communication port.

28. The device of claim 5, further comprising an outer layer residing outside of the shell.

29. The device of claim 28, wherein the outer layer is coupled to the shell.

30. The device of claim 28, wherein the outer layer seals the shell.

31. The device of claim 28, wherein the outer layer comprises at least one window, wherein the at least one light-emitting device emits light through the at least one window.

32. The device of claim 28, wherein the light from the at least one light-emitting device emits light through an optically transmissive outer layer.

33. The device of claim 28, wherein the outer layer is formed by an injection mold process.

34. The device of claim 28, further comprising a loop coupled to the outer layer, wherein the device can be suspended or attached or positioned utilizing the loop.

35. The device of claim 5, wherein the at least one light-emitting device comprises one or more of the group consisting of:

a light-emitting diode (LED);
a laser source;
a fluorescent tube;
a strobe light;
an incandescent bulb;
a waveguide; and
a surface light emitter.

36. The device of claim 5, further comprising a monitoring mechanism for adjusting an intensity of the at least one light-emitting device based upon an intensity of ambient light.

37. The device of claim 5, wherein the light comprises infrared light visible with night vision equipment.

38. The device of claim 5, wherein the device is utilized as a location or target marker.

39. The device of claim 5, wherein the device is utilized to illuminate an area surrounding the device.

40. The device of claim 5, wherein the device is utilized as a signal emitter.

41. The device of claim 5, wherein the device is utilized in traffic safety or control.

42. The device of claim 5, wherein the device is utilized as firefighter beacons.

43. The device of claim 5, wherein the device is utilized as a landing zone marker.

44. The device of claim 5, wherein the device is utilized underwater.

45. The device of claim 15, further comprising an outer layer coupled to outside of the shell, wherein the loop is coupled to the outer layer.

46. A power charger, comprising:
a first arm and a second arm;
a region coupling the first and second arms, wherein the region flexes when a first end of the first arm and a first end of the second arm are moved toward each other;
a first contact at a second end of the first arm distal to the first end of the first arm; and
a second contact at a second end of the second arm distal to the first end of the second arm, wherein the first and second contacts may form an electrical connection between a power source and an illumination device, wherein the illumination device comprises:
a shell comprising a plurality of sides, wherein the illumination device can be positioned upon a surface or attached or suspended at any of the plurality of sides, and
at least one light-emitting device within the shell, wherein when the illumination device is positioned upon a surface or attached or suspended at any of the plurality of sides of the shell, light from the at least one light-emitting device emits through each of the plurality of sides of the shell.

47. The charger of claim 46, wherein the charger further comprises;
a first grip at the first end of the first arm; and
a second grip at the first end of the second arm, wherein the first and second grips facilitate the moving of the first ends of the first and second arms toward each other.

48. The charger of claim 46, wherein the charger further comprises:
teeth at the first ends of the first and second arms for engaging pockets in the shell.

49. The charger of claim 46, wherein the charger further comprises:
a magnet functioning as a switch to turn the device on and off.

* * * * *